Sept. 9, 1941.         H. C. HARRIS         2,255,253
                          PLOW
              Filed Nov. 12, 1940          2 Sheets-Sheet 2
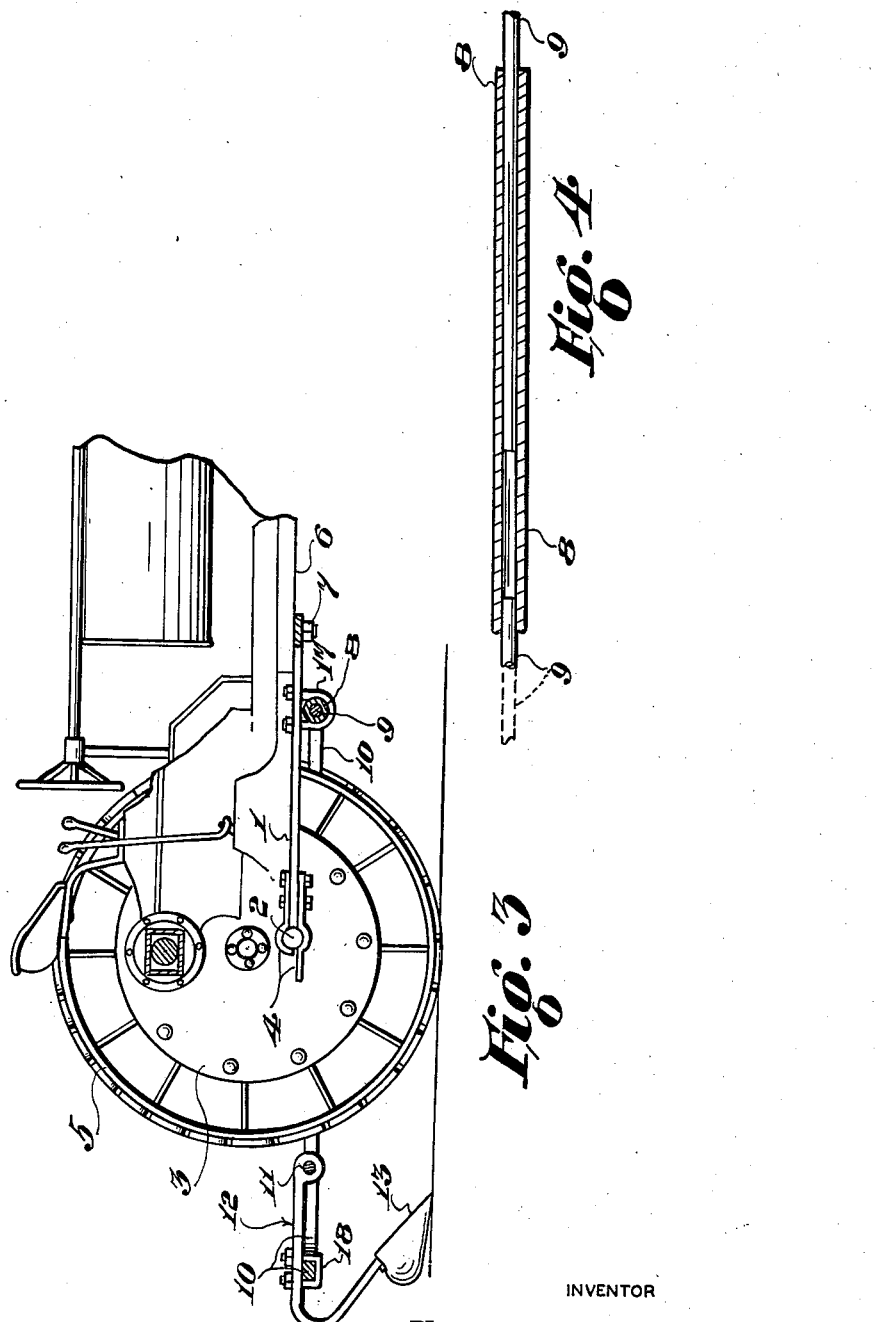
INVENTOR
Henry Clayton Harris
BY John M. Spellman
ATTORNEY Patented Sept. 9, 1941

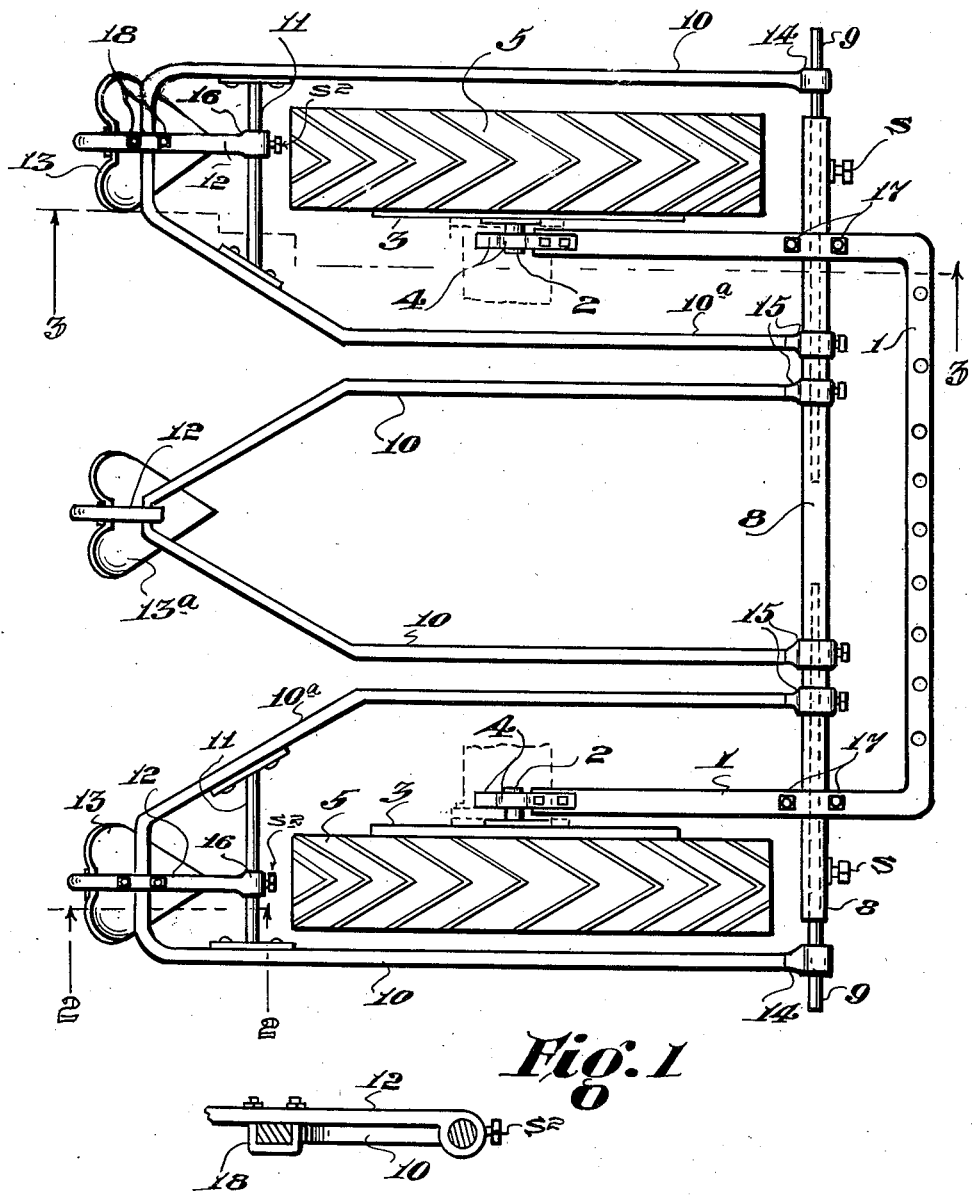

2,255,253

UNITED STATES PATENT OFFICE 2,255,253

PLOW

Henry Clayton Harris, Pittsburg, Tex.

Application November 12, 1940, Serial No. 365,152

3 Claims. (Cl. 97—47)

This invention relates to agricultural implements and in such connection it relates more particularly to gang plows of the buster type.

The primary object of the invention is the provision of a plow of the type referred to which may be adjusted more easily for different width of rows than similar plows of this nature. The improved plow construction also provides means whereby it may be attached to and detached from a farm tractor with a minimum of time and labor.

A further object of the invention resides in the provision of a plow of this nature which is compactly and strongly built and of comparatively few parts.

The invention will be readily understood from a perusal of the following detailed description, taken in connection with the accompanying drawings, and in the drawings:

Figure 1 is a top plan view of the invention, showing the same attached to the draw-bar of a farm tractor and also showing the drive wheels of the tractor;

Figure 2 is a sectional detail view of one end of the plow frame, the view being had on the line 2—2 of Figure 1;

Figure 3 is a vertical sectional view of Figure 1, the view being taken along the line 3—3 of Figure 1, with additional fragmentary parts of the tractor added; and Figure 4 is a fragmentary, sectional view of the means for attaching the plow frame to the tractor draw-bar.

Referring more in detail to the drawings, in Figure 1 is illustrated the drive wheels and the draw-bar of a farm tractor of a type wherein the draw-bar 1 is attached to an ear 2, or similar protuberance which is mounted on the inner plate or housing of the bull gearing, said plate being indicated at 3. In this manner the draw-bar 1 may be swung by means of the swivel clamps or similar parts indicated at 4 to either the rear part of the tractor behind the drive wheels for disc plows or to the front of the tractor and underneath the same and in front of the drive wheels 5, as clearly shown in Figure 3. The draw-bar 1 is then connected to the tractor frame 6 in any preferred manner, as by the bolt and nut 7. It is of course necessary that in swinging the draw-bar to the front of the tractor that the drive wheels 5 be jacked up to provide clearance for the draw-bar.

The preceding, however, relates only to a particular type of tractor to which the invention may be attached, the draw-bar, swivel connection and related parts not being a part of this invention.

The plow on which a patent is sought embodies a frame consisting of the rods 8 and 9, the series of substantially U-shaped bars 10, with their cross-braces 11, and the plow supporting beams or arms 12 which each carry a buster plow 13.

The free ends of the U-shaped bars 10 each include a cuff 14, these cuffs 14 having openings for connection around the rods 9 (movable inside the tubular rod 8) the rods 9 being adapted to be slid inside this tubular rod in making adjustments as will be hereinafter referred to in detail. Cuffs 15 of a larger diameter are carried on the ends of the U-shaped bars 10 so that they may embrace the tubular rod 8 to also provide a shiftable action thereon. Similarly, the plow supporting arms or beams 12 are provided with cuffs 16. The middle plow 13$^a$ is maintained in a fixed position, susceptible, however, to the raising and lowering operation imparted by the customary power lift carried on this type of tractor. U-bolts 17 hold the tubular rod 8 to the draw-bar 1, and similar U-bolts 18 hold the plow arms or beams 12 in position after adjustment.

The three buster plow feet or plows are operated separately so as to contact the soil in high and low places, and any one or two of the busters may be raised and the plowing performed by those contacting the soil. It will also be noted that a novel feature of the plow frame provides a structure which fits around the drive wheels and that the plows or busters travel directly behind the drive wheels 5.

In adjusting the plow for rows from 2½ ft. to 3 ft. 8 in. approximately, it is only necessary to loosen cuff 16 and the corresponding U-bolt 18 on the plow arm or beam 12, and slide the beam inwardly or outwardly. If wider rows than the above are desired, loosen the cuff 15 on one or both of the inner legs 10$^a$ of the U-shaped member, which cuff embraces the larger or tubular rod 8, together with the set screw S, and push the outer bar 10 outwardly, which simultaneously slides the rod 9 outwardly from within the tubular rod 8. If it is desired to plow a row of, say, 5 ft., the two outside plows are moved inwardly as close as possible, as previously described for moving them outwardly, the center plow 13$^a$ is then elevated, and the plowing done with the two outside plows. The same procedure is had on either side of the frame in moving the outside plows inwardly or outwardly, namely, loosening the U-bolts 16 on the plow arms or beams 12, together with the set-screws S2 which hold the cuffs 16 rigid on the cross-arms 11; and for wider rows, shifting the entire U-shaped member consisting of the bars 10 and 10a together with the simultaneous outward movement of the smaller, inner rods 9, to desired distances.

From the foregoing it will be apparent that the plow structure presents several novel features not present in plows of this nature as now constructed; and it is believed that the operation of the plow will be clearly understood without further explanation. It is to be understood, however, that the invention may be modified and changed without departing from the intent thereof, and to an extent which would be within the scope and meaning of the following claims.

What is claimed is:

1. A buster gang plow of the character described, in combination with the draw-bar of a tractor, comprising a plurality of substantially U-shaped plow frame members, each of said members carrying a plow foot; a tubular rod removably secured to the tractor draw-bar for connecting the plow frame to the tractor, a pair of rods slidably disposed inside the tubular rod; means for adjustably moving the plow feet individually with respect to each U-shaped frame member, and means for slidably connecting the free ends of the U-shaped frame members respectively to the tubular rod and to the rods slidable therein.

2. A buster gang plow of the nature described and adapted for use with a farm tractor having a draw-bar, comprising a plurality of substantially U-shaped plow frame members, each of said members having slidably mounted at one end thereof a plow beam carrying a plow foot whereby the outer plow feet may be slid laterally to obtain row width; said plow structure including a tubular rod rigidly secured to the draw-bar of the tractor and having a pair of rods slidable therein; means for adjustably connecting one leg of each of the outside U-shaped members to said tubular rod and the other leg to said slidable rods in moving the U-shaped members to or from each other in making further row width adjustments.

3. A buster gang plow of the class described, in combination with the draw-bar of a farm tractor, comprising a plurality of substantially U-shaped frame members open at one end and providing legs, one end of the outer members having a cross-bar, a plow-beam carrying a plow foot, adjustably mounted on the cross-bar; a tubular rod secured to the draw-bar, the latter being connected to the underside of the tractor whereby the outer U-shaped members are made to surround or straddle the tractor drivewheels; said legs being adjustably connected to said tubular rod; a pair of rods inside the tubular rod, said legs being also adjustably connected to said inner rods whereby the inner rods may be slid inwardly or outwardly in making row width adjustments.

HENRY CLAYTON HARRIS.